(12) United States Patent
Goto et al.

(10) Patent No.: US 11,298,685 B2
(45) Date of Patent: *Apr. 12, 2022

(54) HONEYCOMB CATALYTIC CONVERTER (71) Applicants: IBIDEN CO., LTD., Ogaki (JP); TOYOTA JIDOSHA KABUSHIKI KAISHA, Toyota (JP)

(72) Inventors: Shinnosuke Goto, Ibi-gun (JP); Takumi Tojo, Toyota (JP); Takeru Yoshida, Toyota (JP); Hiromasa Suzuki, Toyota (JP)

(73) Assignees: IBIDEN CO., LTD., Ogaki (JP); TOYOTA JIDOSHA KABUSHIKI KAISHA, Toyota (JP)

(*) Notice: Subject to any disclaimer, the term of this patent is extended or adjusted under 35 U.S.C. 154(b) by 1 day.

This patent is subject to a terminal disclaimer.

(21) Appl. No.: 16/830,272

(22) Filed: Mar. 26, 2020

(65) Prior Publication Data
US 2020/0222882 A1    Jul. 16, 2020

Related U.S. Application Data

(63) Continuation of application No. PCT/JP2018/035836, filed on Sep. 27, 2018.

(30) Foreign Application Priority Data

Sep. 27, 2017  (JP) .............................. JP2017-186472

(51) Int. Cl.
*B01J 21/04*  (2006.01)
*B01J 21/06*  (2006.01)
(Continued)

(52) U.S. Cl.
CPC .......... *B01J 23/63* (2013.01); *B01D 53/9468* (2013.01); *B01J 23/10* (2013.01); *B01J 35/04* (2013.01);
(Continued)

(58) Field of Classification Search
CPC ........ B01J 21/04; B01J 21/066; B01J 23/002; B01J 23/10; B01J 23/44; B01J 23/464; B01J 23/63; B01J 35/04; F01N 3/2803
See application file for complete search history.

(56) References Cited

U.S. PATENT DOCUMENTS 5,139,992 A     8/1992  Tauster et al.
5,296,198 A *   3/1994  Abe ..................... F01N 3/0835
                                                          422/180
(Continued)

FOREIGN PATENT DOCUMENTS

EP    0559844 B1     9/1993
EP    0798042       10/1997
(Continued)

OTHER PUBLICATIONS

Office Action with Form PTO-892 Notice of References Cited issued by the United States Patent and Trademark Office for the co-pending U.S. Appl. No. 16/830,275, dated Jan. 7, 2021.
(Continued)

*Primary Examiner* — Cam N. Nguyen
(74) *Attorney, Agent, or Firm* — Mori & Ward, LLP (57) ABSTRACT

The present invention provides a honeycomb catalytic converter including: a honeycomb structured body in which multiple through-holes are arranged longitudinally in parallel with one another with a partition wall therebetween; and a noble metal supported on the honeycomb structured body, wherein the honeycomb structured body contains a ceria-zirconia composite oxide and alumina, and cerium on a surface of each partition wall has a lower concentration than cerium in a central portion of the partition wall in a thickness direction.

17 Claims, 1 Drawing Sheet

(51) Int. Cl.
*B01J 23/00* (2006.01)
*B01J 23/10* (2006.01)
*B01J 23/44* (2006.01)
*B01J 23/46* (2006.01)
*B01J 23/63* (2006.01)
*B01J 35/04* (2006.01)
*F01N 3/28* (2006.01)
*B01D 53/94* (2006.01)

(52) U.S. Cl.
CPC ........ *F01N 3/28* (2013.01); *B01D 2255/1023* (2013.01); *B01D 2255/1025* (2013.01); *B01D 2255/9022* (2013.01); *F01N 2330/02* (2013.01); *F01N 2370/02* (2013.01)

(56) References Cited

U.S. PATENT DOCUMENTS

| | | | | |
|---|---|---|---|---|
| 5,318,757 | A * | 6/1994 | Abe | F01N 3/2026 422/174 |
| 5,376,610 | A * | 12/1994 | Takahata | F01N 13/0097 502/66 |
| 5,459,119 | A * | 10/1995 | Abe | B01J 37/0248 502/326 |
| 5,753,580 | A | 5/1998 | Hayashi et al. | |
| 5,895,700 | A | 4/1999 | Yamada et al. | |
| 6,087,298 | A | 7/2000 | Sung et al. | |
| 6,492,297 | B1 | 12/2002 | Sung | |
| 6,497,851 | B1 | 12/2002 | Hu et al. | |
| 7,731,774 | B2 * | 6/2010 | Ohno | F01N 3/0222 55/523 |
| 7,737,077 | B2 | 6/2010 | Kitamura et al. | |
| 7,759,283 | B2 * | 7/2010 | Yamato | B01D 53/944 502/339 |
| 7,871,452 | B2 * | 1/2011 | Yamada | B01J 37/024 55/523 |
| 8,048,382 | B2 | 11/2011 | Ohno et al. | |
| 8,071,502 | B2 | 12/2011 | Shimizu et al. | |
| 8,207,078 | B2 | 6/2012 | Lu et al. | |
| 8,226,898 | B2 | 7/2012 | Miwa et al. | |
| 8,323,766 | B2 * | 12/2012 | Ido | C04B 37/005 428/116 |
| 8,323,767 | B2 * | 12/2012 | Ido | B01J 37/0201 428/116 |
| 8,580,705 | B2 * | 11/2013 | Aoki | B01D 53/945 502/304 |
| 8,691,157 | B2 * | 4/2014 | Kunieda | B01J 29/88 422/180 |
| 8,796,172 | B2 * | 8/2014 | Chinzei | B01J 37/0248 502/327 |
| 8,961,886 | B2 * | 2/2015 | Kunieda | B01J 29/88 422/177 |
| 9,266,092 | B2 | 2/2016 | Arnold et al. | |
| 9,550,169 | B2 * | 1/2017 | Kadota | C04B 38/0006 |
| 9,597,663 | B2 | 3/2017 | Inoda et al. | |
| 9,700,842 | B2 * | 7/2017 | Miyairi | B01D 46/2459 |
| 10,472,290 | B2 * | 11/2019 | Goto | B01D 53/94 |
| 10,507,457 | B2 * | 12/2019 | Kadota | C04B 35/50 |
| 10,625,208 | B2 | 4/2020 | Bergeal et al. | |
| 10,953,395 | B2 * | 3/2021 | Goto | C04B 35/6365 |
| 2004/0001781 | A1 | 1/2004 | Kumar et al. | |
| 2008/0081761 | A1 | 4/2008 | Suzuki | |
| 2009/0239744 | A1 * | 9/2009 | Ohno | C04B 38/0006 502/328 |
| 2009/0246103 | A1 * | 10/2009 | Ohno | B01J 37/0009 422/222 |
| 2009/0291826 | A1 * | 11/2009 | Ohno | B01D 46/2455 502/64 |
| 2010/0087314 | A1 | 4/2010 | Kitamura et al. | |
| 2010/0196221 | A1 * | 8/2010 | Ando | B01J 23/42 422/171 |
| 2010/0263357 | A1 * | 10/2010 | Lindner | B01J 37/0244 60/299 |
| 2011/0200505 | A1 | 8/2011 | Cavataio et al. | |
| 2012/0070346 | A1 | 3/2012 | Mizutani et al. | |
| 2013/0011304 | A1 * | 1/2013 | Schumann | C04B 35/478 422/168 |
| 2013/0336864 | A1 | 12/2013 | Zheng et al. | |
| 2014/0030158 | A1 * | 1/2014 | Takagi | B01J 37/031 422/168 |
| 2014/0205523 | A1 | 7/2014 | Arnold et al. | |
| 2015/0209726 | A1 * | 7/2015 | Difrancesco | B01D 53/8628 422/180 |
| 2015/0375206 | A1 | 12/2015 | Aoki | |
| 2016/0074800 | A1 * | 3/2016 | Ito | B01D 46/2418 428/117 |
| 2017/0306823 | A1 | 10/2017 | Onoe et al. | |
| 2018/0015411 | A1 * | 1/2018 | Onoe | B01D 53/94 |
| 2018/0229183 | A1 | 8/2018 | Kadota et al. | |
| 2019/0136730 | A1 * | 5/2019 | Onozuka | B01J 37/0234 |
| 2019/0143312 | A1 * | 5/2019 | Goto | C04B 35/6268 502/304 |
| 2019/0144342 | A1 * | 5/2019 | Goto | B01D 53/94 422/180 |

FOREIGN PATENT DOCUMENTS

| | | |
|---|---|---|
| EP | 2130600 | 12/2009 |
| EP | 2556871 | 2/2013 |
| GB | 2558186 | 7/2018 |
| JP | 62-068543 | 3/1987 |
| JP | 07-060117 | 3/1995 |
| JP | 10-296085 | 11/1998 |
| JP | 2002-210371 | 7/2002 |
| JP | 2004-066069 | 3/2004 |
| JP | 2005-530614 | 10/2005 |
| JP | 2006-188404 | 7/2006 |
| JP | 2006-205050 | 8/2006 |
| JP | 2009-011937 | 1/2009 |
| JP | 2009-255032 | 11/2009 |
| JP | 2009-273988 | 11/2009 |
| JP | 2010-127210 | 6/2010 |
| JP | 2012-040547 | 3/2012 |
| JP | 2013-522020 | 6/2013 |
| JP | 2014-147858 | 8/2014 |
| JP | 2014-151306 | 8/2014 |
| JP | 2015-085241 | 5/2015 |
| JP | 2016-505380 | 2/2016 |
| JP | 2016-123890 | 7/2016 |
| JP | 2016-131968 | 7/2016 |
| JP | 2017-006827 | 1/2017 |
| JP | 2017-039069 | 2/2017 |
| WO | WO 2004/002621 | 1/2004 |
| WO | WO 2011/125766 | 10/2011 |
| WO | WO 2014/116897 | 7/2014 |
| WO | WO 2016/060048 | 4/2016 |

OTHER PUBLICATIONS

Office Action with Form PTO-892 Notice of References Cited issued by the United States Patent and Trademark Office for the co-pending U.S. Appl. No. 16/830,277, dated Jan. 7, 2021.
Office Action with Form PTO-892 Notice of References Cited issued by the United States Patent and Trademark Office for the co-pending U.S. Appl. No. 16/830,275, dated Jul. 19, 2021.
Office Action with Form PTO-892 Notice of References Cited issued by the United States Patent and Trademark Office for the co-pending U.S. Appl. No. 16/830,277, dated Aug. 4, 2021.
Office Action with Form PTO-892 Notice of References Cited issued by the United States Patent and Trademark Office for the co-pending U.S. Appl. No. 16/830,276, dated Aug. 31, 2021.
Office Action with Form PTO-892 Notice of References Cited issued by the United States Patent and Trademark Office for the co-pending U.S. Appl. No. 16/830,278, dated Aug. 31, 2021.
Advisory Action issued by the U.S. Patent and Trademark Office for the co-pending U.S. Appl. No. 16/830,275, filed Nov. 19, 2021.
Notice of Allowance issued by the United States Patent and Trademark Office for the co-pending U.S. Appl. No. 16/830,276, filed Dec. 13, 2021.

(56) References Cited

OTHER PUBLICATIONS

Notice of Allowance issued by the United States Patent and Trademark Office for the co-pending U.S. Appl. No. 16/830,278, filed Dec. 14, 2021.
Advisory Action issued by the U.S. Patent and Trademark Office for the co-pending U.S. Appl. No. 16/830,277, filed Dec. 15, 2021.
Office Action with Form PTO-892 Notice of References Cited issued by the United States Patent and Trademark Office for the co-pending U.S. Appl. No. 16/830,279, filed Feb. 3, 2022.

* cited by examiner

HONEYCOMB CATALYTIC CONVERTER

TECHNICAL FIELD

The present invention relates to a honeycomb catalytic converter.

BACKGROUND ART

Exhaust gas discharged from internal combustion engines of automobiles and the like contains harmful gases such as carbon monoxide (CO), nitrogen oxides (NOx), and hydrocarbons (HC). An exhaust gas catalytic converter that decomposes such harmful gases is also referred to as a three-way catalytic converter. A common three-way catalytic converter includes a catalyst layer that is formed by wash-coating the slurry containing noble metal particles having catalytic activity on a honeycomb monolithic substrate made of cordierite or the like.

Patent Literature 1 discloses an exhaust gas catalytic converter including a Pd-carrying porous substrate and a Rh-carrying coat layer made of a ceria-zirconia solid solution on the porous substrate.

CITATION LIST

Patent Literature

Patent Literature 1: JP 2017-39069 A

SUMMARY OF INVENTION

Technical Problem

Yet, there is a demand for a honeycomb catalytic converter that exhibits higher exhaust gas conversion performance than the exhaust gas catalytic converter disclosed in Patent Literature 1.

The present inventors conducted extensive studies on the exhaust gas catalytic converter disclosed in Patent Literature 1. As a result, the present inventors presumed that in the exhaust gas catalytic converter disclosed in Patent Literature 1, since the surface of the porous substrate is covered by the coat layer made of a ceria-zirconia solid solution having an oxygen storage capacity (OSC), oxygen is not sufficiently supplied to the deep inside of the porous substrate due to the coat layer. The present inventors presumed that in the exhaust gas catalytic converter disclosed in Patent Literature 1, since a first catalyst (Pd) is supported inside the porous substrate, Pd impregnated inside the porous substrate fails to exhibit exhaust gas oxidization capacity. In addition, when exhaust gas is switched from a lean condition (insufficient fuel) that lasted for some time to a rich condition (excessive fuel), the supported Ph may be oxidized by a large amount of oxygen released from the coat layer, resulting in poor NOx reduction performance.

The present invention was made to solve the above problems. An object of the present invention is to provide a honeycomb catalytic converter capable of providing higher exhaust gas conversion performance.

Solution to Problem

Specifically, the present invention provides a honeycomb catalytic converter including: a honeycomb structured body in which multiple through-holes are arranged longitudinally in parallel with one another with a partition wall therebetween; and a noble metal supported on the honeycomb structured body, wherein the honeycomb structured body contains a ceria-zirconia composite oxide and alumina, and cerium on a surface of each partition wall has a lower concentration than cerium in a central portion of the partition wall in a thickness direction.

In the honeycomb catalytic converter of the present invention, cerium on the surface of each partition wall has a lower concentration than cerium in the central portion of the partition wall. This means that the concentration of the ceria-zirconia composite oxide is lower on the surface of each partition wall than in the central portion of the partition wall. When the ceria-zirconia composite oxide on the surface of each partition wall has a lower concentration, it allows oxygen to easily reach the central portion of each partition wall, which allows the noble metal supported inside the partition walls to sufficiently exhibit its catalytic effect, thus improving the exhaust gas conversion performance.

Cerium on the surface of each partition wall has a lower concentration than cerium in the central portion of the partition wall. This can be confirmed by secondary ion mass spectrometry (hereinafter also referred to as "SIMS") in the depth direction from the surface of the partition wall.

Specifically, surfaces of the partition walls are randomly selected at five portions by secondary ion mass spectrometry. Subsequently, the concentration of cerium on each selected surface and the concentration of cerium at a depth away from the surface in a depth direction by a distance corresponding to half the thickness of the partition wall are measured to compare between the concentration of cerium on the surface of each partition wall and the concentration of cerium located deep inside (central portion) of the partition wall. The concentration of cerium at a depth away from the surface in a depth direction by a distance corresponding to half the thickness of the partition wall can be measured by continuously irradiating the selected surface with beams for a predetermined time. When the concentration of cerium on the surface of each partition wall is lower than the concentration of cerium located deep inside of the partition wall in all the five selected portions, the concentration of cerium on the surface of each partition wall is determined to be lower than the concentration of the noble metal (cerium) in the central portion of the partition wall in the thickness direction.

In the honeycomb catalytic converter of the present invention, preferably, the honeycomb structured body further contains an inorganic binder.

When the honeycomb structured body further contains an inorganic binder, the mechanical strength of the honeycomb structured body can be increased.

In the honeycomb catalytic converter of the present invention, preferably, each partition wall includes a substrate portion in the form of an extrudate containing ceria-zirconia composite oxide particles and alumina particles, and a coat layer formed on a surface of each substrate portion and containing the noble metal.

When the partition wall has the above structure, the proportion of the ceria-zirconia composite oxide can be easily changed, and the concentration of cerium can be easily changed between the surface and the central portion of the partition wall in the thickness direction.

In the honeycomb catalytic converter of the present invention, preferably, the noble metal is supported on the substrate portion.

When the noble metal is supported not only on the coat layers but also on the substrate portions, it can increase the exhaust gas conversion efficiency.

In the honeycomb catalytic converter of the present invention, preferably, Pd is supported on each substrate portion, and Rh is supported on each coat layer.

When Rh is supported on the coat layer near the surface of each partition wall, NOx can be reduced without oxidizing a reducing agent. Further, when Pd is supported on the substrate portion near the center of each partition wall, oxidation of exhaust gas inside the partition wall can be facilitated.

In the honeycomb catalytic converter of the present invention, preferably, each partition wall has a thickness of 0.05 to 0.25 mm.

When the thickness of each partition wall is in the above range, the mechanical strength and the exhaust gas conversion performance of the honeycomb fired body can be easily achieved in a balanced manner.

Preferably, the honeycomb catalytic converter of the present invention has a length to diameter ratio (length/diameter) of 0.5 to 1.1.

The honeycomb catalytic converter having a shape with a length to diameter ratio in the above range can easily achieve the required exhaust gas conversion performance while the pressure loss is kept low.

In the honeycomb catalytic converter of the present invention, preferably, the honeycomb catalytic converter has a diameter of 130 mm or less.

The honeycomb catalytic converter having a diameter of 130 mm or less can be made less susceptible to breakage from thermal shock.

DESCRIPTION OF EMBODIMENTS

Honeycomb Catalytic Converter

Figure 1:
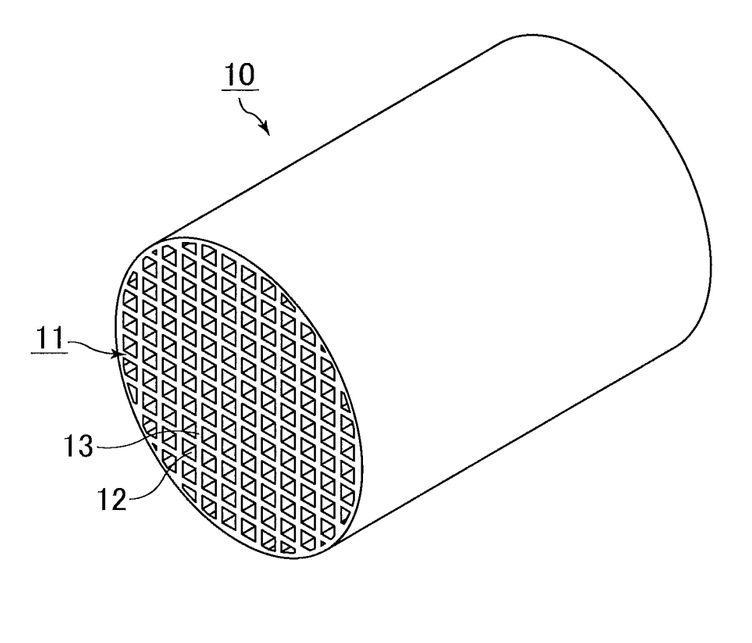
The FIGURE is a schematic perspective view of an example of the honeycomb catalytic converter of the present invention.

First, the honeycomb catalytic converter of the present invention is described.

The honeycomb catalytic converter of the present invention includes a honeycomb structured body in which multiple through-holes are arranged longitudinally in parallel with one another with a partition wall therebetween, and a noble metal supported on the honeycomb structured body.

In the honeycomb catalytic converter of the present invention, the honeycomb structured body contains a ceria-zirconia composite oxide (hereinafter also referred to as "CZ") and alumina.

Whether or not the honeycomb catalytic converter of the present invention contains the above components can be confirmed by X-ray diffraction (XRD).

In the honeycomb catalytic converter of the present invention, cerium on the surface of each partition wall has a lower concentration than cerium in the central portion of the partition wall.

This means that the concentration of the ceria-zirconia composite oxide is lower on the surface of each partition wall than in the central portion of the partition wall. When the ceria-zirconia composite oxide on the surface of each partition wall has a lower concentration, it allows oxygen to easily reach the central portion of the partition wall, which allows the noble metal supported inside the partition wall to sufficiently exhibit its catalytic effect, thus improving the exhaust gas conversion performance.

Cerium on the surface of each partition wall has a lower concentration than cerium in the central portion of the partition wall. This can be confirmed by secondary ion mass spectrometry (hereinafter also referred to as "SIMS") as described above.

The honeycomb structured body defining the honeycomb catalytic converter of the present invention may include a single honeycomb fired body or multiple honeycomb fired bodies, and the multiple honeycomb fired bodies may be combined together with an adhesive layer.

The honeycomb fired body is produced by extrusion-molding a raw material paste containing ceria-zirconia composite oxide particles (hereinafter also referred to as "CZ particles") and alumina particles, and firing the resulting extrudate.

The FIGURE is a schematic perspective view of an example of the honeycomb catalytic converter of the present invention.

A honeycomb catalytic converter 10 shown in THE FIGURE includes a single honeycomb structured body 11 in which multiple through-holes 12 are arranged longitudinally in parallel with one another with a partition wall 13 therebetween.

The honeycomb structured body 11 contains CZ and alumina, and carries a noble metal.

Each partition wall constituting the honeycomb fired body may include a coat layer on a surface.

When the coat layer is formed on the surface of each partition wall constituting the honeycomb fired body, the partition walls (also referred to as a "substrate portion") constituting the honeycomb fired body, with the coat layer on the surface of each partition wall, are regarded as the partition walls of the honeycomb structured body. The coat layer may be a coat layer containing a noble metal.

In the honeycomb catalytic converter of the present invention, preferably, the partition walls constituting the honeycomb structured body each include a substrate portion made of an extrudate containing ceria-zirconia composite oxide particles and alumina particles, and a coat layer formed on a surface of the substrate portion and containing the noble metal.

When the coat layer is formed on the surface of each partition wall constituting the honeycomb fired body, the thickness of the coat layer on one side is preferably 0.01 to 0.10 mm, more preferably 0.02 to 0.05 mm.

In order to increase thermal shock resistance, preferably, CZ particles contained in the honeycomb catalytic converter of the present invention have an average particle diameter of 1 to 50 μm. The average particle diameter of the CZ particles is more preferably 1 to 30 μm.

When the CZ particles have an average particle size of 1 to 50 μm, the resulting honeycomb catalytic converter has a larger surface area, thus achieving a higher OSC.

The alumina particles contained in the honeycomb catalytic converter of the present invention may have any average particle diameter. Yet, in order to increase exhaust gas conversion performance, the average particle diameter is preferably 1 to 10 μm, more preferably 1 to 5 μm.

The average particle diameters of the CZ particles and alumina particles contained in the honeycomb catalytic converter of the present invention can be determined by taking a scanning electron microscope (SEM) image of the honeycomb catalytic converter with a SEM (S-4800 available from Hitachi High-Technologies Corporation).

Preferably, the honeycomb catalytic converter of the present invention contains 15 to 35 wt % alumina particles.

Preferably, the honeycomb catalytic converter of the present invention contains 10 to 40 wt % cerium in terms of oxide ($CeO_2$).

In the honeycomb catalytic converter of the present invention, the concentration of cerium on the surface of each partition wall is preferably 5 to 30 wt %, and the concentration of cerium in the central portion of the partition wall in the thickness direction is preferably 10 to 50 wt %.

In the honeycomb catalytic converter of the present invention, ceria in the ceria-zirconia complex oxide of the CZ particles has an OSC. The ceria-zirconia complex oxide preferably forms a solid solution of ceria and zirconia.

In the honeycomb catalytic converter of the present invention, the amount of ceria in the ceria-zirconia complex oxide is preferably 30 wt % or more, more preferably 40 wt % or more, and preferably 90 wt % or less, more preferably 80 wt % or less. The amount of zirconia in the ceria-zirconia complex oxide is preferably 60 wt % or less, more preferably 50 wt % or less. Such a ceria-zirconia complex oxide has a high ceria content and thus has a high OSC.

In the honeycomb catalytic converter of the present invention, the alumina particles may be of any type, but θ-phase alumina particles (hereinafter also referred to as "θ-alumina particles") are preferred.

Use of θ-phase alumina particles as dividers for the ceria-zirconia complex oxide can prevent sintering of alumina particles to one another by heat during use, allowing for sustained catalytic function. Further, use of θ-phase alumina particles can increase heat resistance.

Preferably, the honeycomb catalytic converter of the present invention contains inorganic particles that are used as an inorganic binder during the production, and more preferably contains γ-alumina particles derived from boehmite.

Preferably, the honeycomb catalytic converter of the present invention contains inorganic fibers, more preferably alumina fibers.

The honeycomb catalytic converter containing inorganic fibers such as alumina fibers can have better mechanical characteristics.

The inorganic fibers are those having an aspect ratio of 5 or more, and the inorganic particles are those having an aspect ratio of less than 5.

Preferably, the honeycomb catalytic converter of the present invention has a length to diameter ratio (length/diameter) of 0.5 to 1.1, more preferably 0.6 to 0.8.

In the honeycomb catalytic converter of the present invention, the diameter of the honeycomb catalytic converter is preferably 130 mm or less, more preferably 125 mm or less. The diameter of the honeycomb catalytic converter is also preferably 85 mm or more.

The honeycomb catalytic converter having a diameter of 130 mm or less can be made less susceptible to breakage from thermal shock.

In the honeycomb catalytic converter of the present invention, the length of the honeycomb catalytic converter is preferably 65 to 120 mm, more preferably 70 to 110 mm.

The shape of the honeycomb catalytic converter of the present invention is not limited to a round pillar shape. Examples include a prism, a cylindroid shape, a pillar shape having an end face with a racetrack shape, and a prism with rounded corners (e.g., a triangular pillar shape with rounded corners).

In the honeycomb catalytic converter of the present invention, preferably, all the partition walls have the same thickness. Specifically, the thickness of each partition wall of the honeycomb catalytic converter is preferably 0.05 to 0.25 mm, more preferably 0.05 to 0.15 mm.

In the honeycomb catalytic converter of the present invention, the shape of the through-holes is not limited to a quadrangular pillar shape. For example, it may be a triangular pillar shape or a hexagonal pillar shape.

In the honeycomb catalytic converter of the present invention, preferably, the density of the through-holes in a cross section perpendicular to the longitudinal direction of the honeycomb catalytic converter is 31 to 155 pcs/$cm^2$.

Preferably, the honeycomb catalytic converter of the present invention has a porosity of 40 to 70%. When the porosity of the catalytic converter is in the above range, the honeycomb catalytic converter can exhibit high exhaust gas conversion performance while the strength is maintained.

The porosity of the honeycomb catalytic converter can be measured by a weighing method described below.

(1) The honeycomb catalytic converter is cut in size of 10 cells×10 cells×10 mm to obtain a measurement sample. The measurement sample is ultrasonically washed with deionized water and acetone, and dried in an oven at 100° C. The measurement sample with a size of 10 cells×10 cells×10 mm is a sample that is cut out such that the sample includes outermost through-holes and partition walls defining these through-holes and has a longitudinal length of 10 mm, with 10 through-holes aligned longitudinally×10 through-holes aligned transversely.

(2) Using a measuring microscope (Measuring Microscope MM-40 available from Nikon, magnification: 100 times), the cross-sectional dimension of the measurement sample is measured, and the volume is determined from a geometric calculation (when the volume cannot be determined from a geometric calculation, the volume is measured by measuring the water-saturated weight and the weight in water).

(3) The weight of the measurement sample substrate on assumption that the measurement sample is a completely dense body is calculated from the calculated volume and the true density of the measurement sample measured with a pycnometer. A measurement procedure using a pycnometer is as described in (4) below.

(4) The honeycomb fired body is pulverized to prepare 23.6 cc of powder. The powder is dried at 200° C. for 8 hours. Subsequently, the true density is measured according to JIS R 1620:1995, using Auto Pycnometer 1320 available from Micromeritics. The evacuation time is 40 minutes.

(5) The actual weight of the measurement sample is measured using an electric balance (HR202i available from A & D).

(6) The porosity of the honeycomb catalytic converter is determined by the following formula.

(Porosity of honeycomb catalytic converter)=100−(actual weight of measurement sample/weight of measurement sample substrate on assumption that the measurement sample is a completely dense body)×100[%]

The honeycomb catalytic converter of the present invention may include a peripheral coat layer on the outer periphery of the honeycomb fired body.

Preferably, the thickness of the peripheral coat layer is 0.1 to 2.0 mm.

In the honeycomb catalytic converter of the present invention, a noble metal is supported on the honeycomb structured body.

Examples of the noble metal include platinum group metals such as Pt, Pd, and Rh.

The noble metal may be directly supported on the honeycomb fired body. Alternatively, the noble metal may be supported through the formation of a coat layer containing the noble metal on the surface of each partition wall constituting the honeycomb fired body.

In the honeycomb catalytic converter of the present invention, the amount of the noble metal supported is preferably 0.1 to 15 g/L, more preferably 0.5 to 10 g/L.

The term "amount of the noble metal supported" as used herein refers to the weight of the noble metal per apparent volume of the honeycomb catalytic converter. The apparent volume of the honeycomb catalytic converter includes the volume of pores and cells, and it includes the volume of the peripheral coat layer and/or the volume of an adhesive layer.

Method of Producing Honeycomb Catalytic Converter

Next, a method of producing the honeycomb catalytic converter of the present invention is described.

The method of producing the honeycomb catalytic converter of the present invention may be, for example, a method that includes a coat layer forming step of forming a coat layer containing a noble metal and a CZ raw material on a surface of each partition wall of a honeycomb fired body produced by the method described below.

Production of Honeycomb Fired Body

First, a method of producing a honeycomb fired body is described.

The method of producing a honeycomb fired body may be, for example, a method that includes a molding step of molding a raw material paste containing CZ particles and alumina particles into a honeycomb molded body in which multiple through-holes are arranged longitudinally in parallel with one another with a partition wall therebetween, and a firing step of firing the honeycomb molded body to produce a honeycomb fired body.

Molding Step

In the molding step, first, a raw material paste containing CZ particles and alumina particles is prepared.

The types, average particle diameters, and the like of the CZ particles and the alumina particles have been described in the above section [Honeycomb catalytic converter], so that a detailed description is omitted.

The average particle diameters of the CZ particles and the alumina particles serving as raw materials of the honeycomb catalytic converter can be determined by a laser diffraction particle size distribution meter (Mastersizer 2000 available from Malvern Panalytical).

Examples of other raw materials used to prepare the raw material paste include inorganic fibers, inorganic binders, organic binders, forming auxiliaries, and dispersion media.

The inorganic fibers may be made of any material. Examples include alumina, silica, silicon carbide, silica alumina, glass, potassium titanate, and aluminum borate. Two or more of these may be used in combination. Of these, alumina fibers are preferred.

The inorganic fibers preferably have an aspect ratio of 5 to 300, more preferably 10 to 200, still more preferably 10 to 100.

Any inorganic binder may be used. Examples include solids contained in materials such as alumina sol, silica sol, titania sol, sodium silicate, sepiolite, attapulgite, and boehmite. Two or more of these inorganic binders may be used in combination.

Of these inorganic binders, boehmite is preferred. Boehmite is alumina monohydrate with a composition of AlOOH, and has good dispersibility in media such as water. Thus, boehmite is preferably used as an inorganic binder.

Any organic binder may be used. Examples include methyl cellulose, carboxymethyl cellulose, hydroxyethyl cellulose, polyethylene glycol, phenolic resin, and epoxy resin. Two or more of these may be used in combination.

Any pore-forming agent may be used. Examples include acrylic resins, coke, and starch. In the present invention, use of two or more selected from acrylic resins, coke, and starch is preferred.

The pore-forming agent is one that is used to introduce pores into a honeycomb fired body when producing a honeycomb fired body.

Any forming auxiliary may be used. Examples include ethylene glycol, dextrins, fatty acids, fatty acid soaps, and polyalcohols. Two or more of these may be used in combination.

Any dispersion medium may be used. Examples include water, organic solvents such as benzene, and alcohols such as methanol. Two or more of these may be used in combination.

When CZ particles, alumina particles, alumina fibers, and boehmite are used as materials of the raw material paste, the proportions of these materials relative to the total solids remaining in the raw material paste after the firing step are preferably as follows: CZ particles: 25 to 75 wt %; alumina particles: 15 to 35 wt %; alumina fibers: 5 to 15 wt %, and boehmite: 5 to 20 wt %.

Preparation of a raw material paste preferably involves mixing/kneading of the raw materials. A device such as a mixer or an attritor may be used for mixing, or a device such as a kneader may be used for kneading.

After a raw material paste is prepared by the above method, the raw material paste is molded into a honeycomb molded body in which multiple through-holes are arranged longitudinally in parallel with one another with a partition wall therebetween.

Specifically, the raw material paste is extrusion-molded into a honeycomb molded body. More specifically, the raw material paste is passed through a die of a specific shape to form a continuous honeycomb molded body having through-holes of a specific shape, and the continuous honeycomb molded body is cut to a specific length, whereby a honeycomb molded body is obtained.

Next, preferably, a dryer such as a microwave dryer, a hot-air dryer, a dielectric dryer, a reduced-pressure dryer, a vacuum dryer, or a freeze-dryer is used to dry the honeycomb molded body to produce a honeycomb dried body.

Herein, the honeycomb molded body and the honeycomb dried body before the firing step are also collectively referred to as a "honeycomb molded body".

Firing Step

In the firing step, the honeycomb molded body is fired to produce a honeycomb fired body. In this step, the honeycomb molded body is degreased and fired. Thus, the step can also be referred to as a "degreasing/firing step", but is referred to as a "firing step" for the purpose of convenience.

The temperature in the firing step is preferably 800° C. to 1300° C., more preferably 900° C. to 1200° C. The duration of the firing step is preferably 1 to 24 hours, more preferably 3 to 18 hours. The atmosphere of the firing step is not limited, but an atmosphere with an oxygen concentration of 1 to 20% is preferred.

The honeycomb fired body can be produced by the above steps.

Subsequently, a description is given on a coat layer forming step of forming a coat layer containing a noble metal, CZ, and alumina on the surface of each partition wall of the honeycomb fired body.

Coat Layer Forming Step

First, a slurry for forming a coat layer, which is used as a raw material of the coat layer, is prepared.

The slurry for forming a coat layer is obtained by mixing CZ particles, alumina particles, and a noble metal with a solvent.

Examples of the noble metal include platinum group metals such as Pt, Pd, and Rh.

The noble metal used to prepare the slurry for forming a coat layer may be a dispersion of noble metal particles or a solution of a noble metal salt or a noble metal complex.

The order of mixing various raw materials to prepare the slurry for forming a coat layer is not limited. In one method, CZ particles, alumina particles, a noble metal, and a solvent are mixed together at once. In another method, CZ particles and a noble metal are first mixed together to obtain noble metal-carrying CZ particles, and subsequently, the noble metal-carrying CZ particles, alumina particles, and a solvent are mixed together. In yet another method, alumina particles and a noble metal are first mixed together to obtain a noble metal-carrying alumina particles, and subsequently, the noble metal-carrying alumina particles, CZ particles, and a solvent are mixed together.

Examples of other raw materials used to prepare the slurry for forming a coat layer include inorganic binders and dispersion media.

Such other raw materials are preferably those used in the raw material paste to produce a honeycomb molded body.

After the honeycomb fired body is immersed in the slurry for forming a coat layer and removed therefrom, the honeycomb fired body is dried and fired, whereby a honeycomb catalytic converter including a coat layer containing a noble metal on a surface of each partition wall constituting the honeycomb fired body is obtained.

The amount of the noble metal supported in the coat layer forming step is, preferably adjusted to 0.1 to 15 g/L, more preferably 0.5 to 10 g/L.

Other Steps

When forming a peripheral coat layer on the outer periphery of the honeycomb fired body, the peripheral coat layer can be formed by applying a peripheral coat layer paste to the outer periphery of the honeycomb fired body excluding both end faces thereof, and then solidifying the peripheral coat layer paste by drying. The peripheral coat layer paste may have the same composition as that of the raw material paste.

When the honeycomb catalytic converter includes a honeycomb structured body in which multiple honeycomb fired bodies are combined together with an adhesive layer therebetween, such a honeycomb structured body can be produced by applying an adhesive layer paste to the outer periphery of each honeycomb fired body excluding both end faces thereof, combining these honeycomb fired bodies, and solidifying the adhesive layer paste by drying. The adhesive layer paste may have the same composition as that of the raw material paste.

EXAMPLES

Examples that more specifically disclose the present invention are described below. The present invention is not limited to these examples.

Production of Honeycomb Catalytic Converter

Production Example 1

The following materials were mixed/kneaded to prepare a raw material paste: CZ particles ($CeO_2$:$ZrO_2$=3:7 (weight ratio); average particle diameter: 2 μm) (26.4 wt %), θ-alumina particles (average particle diameter: 2 μm) (13.2 wt %), alumina fibers (average fiber diameter: 3 μm; average fiber length: 60 μm) (5.3 wt %), boehmite as an inorganic binder (11.3 wt %), methyl cellulose as an organic binder (5.3 wt %), acrylic resin as a pore-forming agent (2.1 wt %), coke also as a pore-forming agent (2.6 wt %), polyoxyethylene oleyl ether (surfactant) as a forming auxiliary (4.2 wt %), and deionized water (29.6 wt %).

Using an extruder, the raw material paste was extrusion-molded into a round pillar-shaped honeycomb molded body. Then, using a reduced-pressure microwave dryer, the honeycomb molded body was dried at an output of 1.74 kW under a reduced pressure of 6.7 kPa for 12 minutes, and then degreased/fired at 1100° C. for 10 hours, whereby a honeycomb fired body was produced. The honeycomb fired body had a round pillar shape with a diameter of 103 mm and a length of 105 mm in which the density of the through-holes was 77.5 pcs/cm$^2$ (500 cpsi) and the thickness of each partition wall was 0.076 mm (3 mil).

Supporting of Noble Metal

A solution of palladium nitrate $Pd(NO_3)_2$ in nitric acid (Pd concentration: 100 g/L) was prepared. The honeycomb fired body produced in Production Example 1 was immersed and kept in the solution for 24 hours. Subsequently, the honeycomb fired body was removed from the solution, dried at 110° C. for 2 hours, and fired at 500° C. for 1 hour in a nitrogen atmosphere, whereby a Pd-carrying honeycomb fired body in which Pd was supported on the honeycomb fired body was obtained.

The amount of Pd supported was 1.2 g/L per apparent volume of the honeycomb fired body.

Example 1

Preparation of Slurry for Forming Coat Layer

CZ particles [$CeO_2$:$ZrO_2$=3:7 (weight ratio); average particle diameter: 2 μm] were added and mixed with a rhodium nitrate solution, and the solvent was dried, followed by firing at 500° C. for 1 hour, whereby Rh-carrying CZ particles in which Rh was supported on the CZ particles were obtained. Subsequently, the Rh-carrying CZ particles (30 parts by weight) and θ-alumina particles (average particle diameter: 2 μm; 70 parts by weight) were mixed together, and the mixture was mixed with ion-exchanged water (400 parts by weight), whereby a slurry for forming a coat layer was prepared.

The slurry for forming a coat layer had a viscosity of 0.7 Pa·s.

Formation of Coat Layer

The Pd-carrying honeycomb fired body was immersed in the slurry for forming a coat layer. Then, the Pd-carrying honeycomb fired body was removed from the slurry for forming a coat layer, and excess slurry attached to the Pd-carrying honeycomb fired body was blown off by a blower. Subsequently, the Pd-carrying honeycomb fired body was dried at 80° C. for 24 hours, and fired at 500° C. for 1 hour, whereby a honeycomb catalytic converter according to Example 1 in which a coat layer containing a noble metal was formed on the surface of each partition wall was obtained.

The thickness of the coat layer on one side of each partition wall was 0.025 mm, and the thickness of the partition wall was 0.126 mm.

The amount of Rh supported was 0.4 g/L per apparent volume of the honeycomb catalytic converter.

Example 2

A honeycomb catalytic converter according to Example 2 was obtained as in Example 1, except that the mixing ratio of Rh-carrying CZ particles to θ-alumina particles in the slurry for forming a coat layer was changed to 40:60 (weight ratio).

Example 3

A honeycomb catalytic converter according to Example 3 was obtained as in Example 1, except that the ratio of ceria to zirconia in the CZ particles of the slurry for forming a coat layer was changed to $CeO_2:ZrO_2=2:8$ (weight ratio).

Comparative Example 1

A honeycomb catalytic converter according to Comparative Example 1 was obtained as in Example 1, except that the shape of the honeycomb fired body was changed such that the density of the through-holes was 77.5 pcs/cm² (500 cpsi) and the thickness of each partition wall was 0.126 mm (5 mil); and that the subsequent noble metal supporting step did not include neither the preparation of a slurry for forming a coat layer nor the formation of a coat layer by using a mixed solution in which a solution of palladium nitrate Pd $(NO_3)_2$ in nitric acid (Pd concentration: 100 g/L) and a solution of rhodium nitrate Rh $(NO_3)_3$ in nitric. acid (Rh concentration: 50 g/L) were mixed together at a weight ratio of 3:1.

The amount of each catalyst supported on the honeycomb catalytic converter according to Comparative Example 1 was as follows: 1.2 g/L of Pd and 0.4 g/L of Rh (1.6 g/L in total).

Comparative Example 2

A honeycomb catalytic converter according to Comparative Example 2 was obtained as in Example 1, except that the mixing ratio (weight ratio) of Rh-carrying CZ particles to θ-alumina particles in the slurry for forming a coat layer was changed to 50:50.

Measurement of Concentration of Cerium

Each of the honeycomb catalytic converters according to Examples 1 to 3 and Comparative Examples 1 and 2 was cut in the longitudinal direction, and five regions were randomly selected from the surfaces of the exposed partition walls. Each surface was observed by SIMS (SIMS 4000 (Atomica); beam diameter: 10 μm; primary ion species: $O^{2+}$; acceleration voltage: 3 keV) to compare the concentration of cerium at a point 10 seconds after the start of the measurement (the concentration of cerium on the surface of the partition wall) and the concentration of cerium at a point 630 seconds after the start of the measurement (the concentration of cerium in the central portion of the partition wall). As a result, in each of the honeycomb catalytic converters according to Examples 1 to 3, the concentration of cerium on the surface of each partition wall was lower than the concentration of cerium in the central portion of the partition wall in each of the five regions. In contrast, in each of the honeycomb catalytic converters according to Comparative Examples 1 and 2, the concentration of cerium on the surface of each partition wall and the concentration of cerium in the central portion of the partition wall were substantially the same in each of the five regions. Table 1 shows an average value of the concentration of cerium (in terms of $CeO_2$) at each of the five regions measured.

Measurement of NOx Conversion Performance

Each of the honeycomb catalytic converters according to Examples 1 to 3 and Comparative Examples 1 and 2 was set in a V8-4.3 L gasoline engine. The honeycomb catalytic converter was heated to 1000° C., and a cycle that repeats stoichiometric feedback, fuel-cut, rich, and lean within one minute was run for consecutive 50 hours.

Subsequently, each honeycomb catalytic converter was set in a V6-3.5 L engine, and the NOx conversion performance [%] in a rich condition was measured. Here, the amount of oxygen A relative to fuel was 0.98 (λ indicates a stoichiometric ratio of oxygen to fuel:λ=1 at a stoichiometric (equivalent) ratio of oxygen to fuel; λ>1 in a reducing atmosphere (rich-burn, rich condition); and λ<1 in an oxidizing atmosphere (lean-burn, lean condition)).

TABLE 1

| | Concentration of cerium [wt %] | | NO x conver- |
| --- | --- | --- | --- |
| | Central portion of partition wall | Surface of partition wall | sion performance [%] |
| Example 1 | 15.0 | 9.0 | 98 |
| Example 2 | 15.0 | 12.0 | 95 |
| Example 3 | 15.0 | 6.0 | 93 |
| Comparative Example 1 | 15.0 | 15.0 | 70 |
| Comparative Example 2 | 15.0 | 15.0 | 68 |

The results in Table 1 show that the honeycomb catalytic converters according to Examples 1 to 3 each in which the concentration of cerium on the surface of each partition wall is lower than the concentration of cerium in the central portion of the partition wall in the thickness direction exhibit higher exhaust gas conversion performance.

REFERENCE SIGNS LIST 10 honeycomb catalytic converter
11 honeycomb structured body
12 through-hole
13 partition wall

The invention claimed is:

1. A honeycomb catalytic converter comprising:
a honeycomb structured body in which multiple through-holes are arranged longitudinally in parallel with one another with a partition wall therebetween; and a noble metal supported on the honeycomb structured body,
wherein the honeycomb structured body contains a ceria-zirconia composite oxide and alumina, and
a concentration of cerium on a surface of each partition wall is lower than a concentration of cerium in a central portion of the partition wall in a thickness direction, and
each partition wall has a thickness of 0.05 to 0.25 mm.

2. The honeycomb catalytic converter according to claim 1,
wherein the honeycomb structured body further contains an inorganic binder.

3. The honeycomb catalytic converter according to claim 2,
wherein each partition wall includes a substrate portion in the form of an extrudate containing ceria-zirconia composite oxide particles and alumina particles, and a coat layer formed on a surface of the substrate portion and containing the noble metal.

4. The honeycomb catalytic converter according to claim 3,
wherein the noble metal is supported on the substrate portion.

5. The honeycomb catalytic converter according to claim 2,
wherein the honeycomb catalytic converter has a length to diameter ratio (length/diameter) of 0.5 to 1.1.

6. The honeycomb catalytic converter according to claim 2,
wherein the honeycomb catalytic converter has a diameter of 130 mm or less.

7. The honeycomb catalytic converter according to claim 1,
wherein each partition wall includes a substrate portion in the form of an extrudate containing ceria-zirconia composite oxide particles and alumina particles, and a coat layer formed on a surface of the substrate portion and containing the noble metal.

8. The honeycomb catalytic converter according to claim 7,
wherein the noble metal is supported on the substrate portion.

9. The honeycomb catalytic converter according to claim 8,
wherein Pd is supported on each substrate portion, and Rh is supported on each coat layer.

10. The honeycomb catalytic converter according to claim 8,
wherein the honeycomb catalytic converter has a length to diameter ratio (length/diameter) of 0.5 to 1.1.

11. The honeycomb catalytic converter according to claim 7,
wherein Pd is supported on each substrate portion, and Rh is supported on each coat layer.

12. The honeycomb catalytic converter according to claim 7,
wherein the honeycomb catalytic converter has a length to diameter ratio (length/diameter) of 0.5 to 1.1.

13. The honeycomb catalytic converter according to claim 7,
wherein the honeycomb catalytic converter has a diameter of 130 mm or less.

14. A honeycomb catalytic converter comprising:
a honeycomb structured body in which multiple through-holes are arranged longitudinally in parallel with one another with a partition wall therebetween; and a noble metal supported on the honeycomb structured body,
wherein the honeycomb structured body contains a ceria-zirconia composite oxide and alumina,
a concentration of cerium on a surface of each partition wall is lower than a concentration of cerium in a central portion of the partition wall in a thickness direction, and
the honeycomb catalytic converter has a length to diameter ratio (length/diameter) of 0.5 to 1.1.

15. The honeycomb catalytic converter according to claim 14,
wherein each partition wall has a thickness of 0.05 to 0.25 mm.

16. A honeycomb catalytic converter comprising:
a honeycomb structured body in which multiple through-holes are arranged longitudinally in parallel with one another with a partition wall therebetween; and a noble metal supported on the honeycomb structured body,
wherein the honeycomb structured body contains a ceria-zirconia composite oxide and alumina,
a concentration of cerium on a surface of each partition wall is lower than a concentration of cerium in a central portion of the partition wall in a thickness direction, and
the honeycomb catalytic converter has a diameter of 130 mm or less.

17. The honeycomb catalytic converter according to claim 16,
wherein each partition wall has a thickness of 0.05 to 0.25 mm.

* * * * *